United States Patent
Satoh et al.

(10) Patent No.: US 11,427,170 B2
(45) Date of Patent: Aug. 30, 2022

(54) VEHICLE BRAKE SYSTEM

(71) Applicants: NISSIN KOGYO CO., LTD., Tomi (JP); VEONEER NISSIN BRAKE SYSTEMS JAPAN CO., LTD., Yokohama (JP)

(72) Inventors: Hiromasa Satoh, Nagano (JP); Toshihiro Obika, Yokohama (JP); Yusuke Koga, Yokohama (JP)

(73) Assignees: HITACHI ASTEMO, LTD., Tomi (JP); HITACHI ASTEMO UEDA CO., LTD., Ueda (JP)

( * ) Notice: Subject to any disclaimer, the term of this patent is extended or adjusted under 35 U.S.C. 154(b) by 452 days.

(21) Appl. No.: 16/626,665

(22) PCT Filed: Mar. 29, 2018

(86) PCT No.: PCT/JP2018/013438
§ 371 (c)(1),
(2) Date: Dec. 26, 2019

(87) PCT Pub. No.: WO2019/003537
PCT Pub. Date: Jan. 3, 2019

(65) Prior Publication Data
US 2020/0223409 A1  Jul. 16, 2020

(30) Foreign Application Priority Data

Jun. 28, 2017  (JP) .............. JP2017-126117

(51) Int. Cl.
*B60T 8/172* (2006.01)
*B60T 13/74* (2006.01)
*B60T 17/18* (2006.01)

(52) U.S. Cl.
CPC .............. *B60T 8/172* (2013.01); *B60T 13/74* (2013.01); *B60T 17/18* (2013.01)

(58) Field of Classification Search
CPC ........... B60T 17/18; B60T 13/74; B60T 8/172
(Continued)

(56) References Cited

U.S. PATENT DOCUMENTS 5,255,962 A   10/1993  Neuhaus et al.
5,696,679 A   12/1997  Marshall et al.
(Continued)

FOREIGN PATENT DOCUMENTS

CN   1602455 A   3/2005
CN   1914068 A   4/2007
(Continued)

OTHER PUBLICATIONS

Chinese Office Action and Search Report, dated May 27, 2021, for Chinese Application No. 201880043670.8, with English machine translations.
(Continued)

*Primary Examiner* — Yazan A Soofi
(74) *Attorney, Agent, or Firm* — Birch, Stewart, Kolasch & Birch, LLP

(57) ABSTRACT

Provided is a vehicle brake system equipped with an electric brake and which has high reliability and enables redundancy at low cost. This vehicle brake system 1 is equipped with a mutually connected master controller 30 and first and second sub-controllers 40, 41, and an output cut-off control unit 200. Each of the controllers includes: a braking force calculation section for calculating the braking force of the electric brake; a self-determination section for determining whether or not the controller itself is normal; and an other-determination section for comparing the braking force calculation results of the controllers to determine whether the other two are normal. Upon determining that the master controller is not normal, the output cut-off control unit cuts off the output of the master controller, the determination
(Continued)

being made on the basis of the self-determination result made by the master controller, the self-determination result and determination result regarding the master controller made by the first sub-controller, and the self-determination result and determination result regarding the master controller made by the second sub-controller.

2 Claims, 4 Drawing Sheets

(58) Field of Classification Search
USPC .......................................................... 701/70
See application file for complete search history.

(56) References Cited

U.S. PATENT DOCUMENTS

| | | | |
|---|---|---|---|
| 6,476,515 B1 | 11/2002 | Yamamoto et al. | |
| 6,749,269 B1 | 6/2004 | Niwa | |
| 9,896,074 B2* | 2/2018 | Endo | B60T 1/10 |
| 10,737,673 B2* | 8/2020 | Nakaoka | B60T 13/741 |
| 11,225,230 B2* | 1/2022 | Tajima | G01D 5/24461 |
| 2007/0168128 A1 | 7/2007 | Tokoro et al. | |
| 2009/0039702 A1 | 2/2009 | Nishino et al. | |
| 2009/0172311 A1* | 7/2009 | Kim | G11C 29/12005 |
| | | | 711/E12.001 |
| 2011/0013323 A1* | 1/2011 | Hyde | H02H 9/005 |
| | | | 361/54 |
| 2011/0043323 A1 | 2/2011 | Hamasako | |
| 2013/0002179 A1 | 1/2013 | Ozaki et al. | |
| 2014/0100719 A1* | 4/2014 | Thibault | B60T 8/1703 |
| | | | 701/3 |
| 2014/0324310 A1 | 10/2014 | Kobayashi et al. | |
| 2016/0231142 A1* | 8/2016 | Kawano | B62D 5/049 |
| 2019/0299944 A1* | 10/2019 | Nilsson | B60T 8/885 |

FOREIGN PATENT DOCUMENTS

| | | |
|---|---|---|
| CN | 102822002 A | 12/2012 |
| CN | 102958767 A | 3/2013 |
| CN | 105035061 A | 11/2015 |
| CN | 105083240 A | 11/2015 |
| CN | 106063096 A | 10/2016 |
| EP | 0 467 112 A2 | 1/1992 |
| JP | 7-9980 A | 1/1995 |
| JP | 7-103786 A | 4/1995 |
| JP | 2001-138882 A | 5/2001 |
| JP | 2009-158081 A | 7/2009 |
| JP | 2011-43957 A | 3/2011 |
| JP | 2013-212814 A | 10/2013 |
| JP | 2016-124509 A | 7/2016 |

OTHER PUBLICATIONS

International Search Report, issued in PCT/JP2018/013438, PCT/ISA/210, dated May 1, 2018.

* cited by examiner

| CASE NUMBER | (1) | (2) | (3) | (4) | (5) | (6) | (7) | (8) | (9) | (10) |
|---|---|---|---|---|---|---|---|---|---|---|
| STATE OF MASTER CONTROLLER 30 | NORMAL | FAILURE | FAILURE | NORMAL | NORMAL | NORMAL | NORMAL | NORMAL | NORMAL | NORMAL |
| STATE OF FIRST SUB-CONTROLLER 40 | NORMAL | NORMAL | NORMAL | FAILURE | FAILURE | NORMAL | NORMAL | CUT-OFF | NORMAL | CUT-OFF |
| STATE OF SECOND SUB-CONTROLLER 41 | NORMAL | NORMAL | NORMAL | NORMAL | NORMAL | FAILURE | FAILURE | NORMAL | CUT-OFF | CUT-OFF |
| OUTPUT OF SELF INH OF MASTER CONTROLLER 30 | 1 | 1 | 0 | 1 | 1 | 1 | 1 | 1 | 1 | 1 |
| OUTPUT OF MASTER INH OF FIRST SUB-CONTROLLER 40 | 1 | 0 | 0 | 0 | 1 | 1 | 1 | 0 | 1 | 0 |
| OUTPUT OF SELF INH OF FIRST SUB-CONTROLLER 40 | 1 | 1 | 1 | 1 | 0 | 1 | 1 | 0 | 1 | 0 |
| OUTPUT OF MASTER INH OF SECOND SUB-CONTROLLER 41 | 1 | 0 | 0 | 1 | 1 | 0 | 1 | 1 | 0 | 0 |
| OUTPUT OF SELF INH OF SECOND SUB-CONTROLLER 41 | 1 | 1 | 1 | 1 | 1 | 1 | 0 | 1 | 0 | 0 |
| OUTPUT OF OR (201) | 1 | 0 | 0 | 1 | 1 | 1 | 1 | 1 | 1 | 0 |
| OUTPUT OF NOR (211) | 0 | 0 | 0 | 0 | 0 | 0 | 0 | 0 | 0 | 1 |
| OUTPUT OF OR (202) | 1 | 0 | 0 | 1 | 1 | 1 | 1 | 1 | 1 | 1 |
| OUTPUT OF AND (221) | 1 | 0 | 0 | 1 | 1 | 1 | 1 | 1 | 1 | 1 |
| POWER SUPPLY TO MASTER CONTROLLER 30 | ON | OFF | OFF | ON | ON | ON | ON | ON | ON | ON |

FIG. 4

VEHICLE BRAKE SYSTEM

TECHNICAL FIELD

The present invention relates to a vehicle brake system having an electric brake.

BACKGROUND ART

A system including two central modules (central control devices), four wheel modules (wheel control devices), and an input device has been proposed as an electric control system of a vehicle brake system (PTL 1). Each of the two central modules controls two wheel modules, respectively. The two central control devices monitor each other and the wheel control devices are separated from a power supply device by the central control devices in case of failure. This system does not monitor the wheel control devices having a lock prevention function or a side slip prevention function.

CITATION LIST

Patent Literature

PTL 1: JP-A-7-9980

SUMMARY OF INVENTION

Technical Problem

An object of the invention is to provide a highly reliable vehicle brake system having an electric brake.

Solution to Problem

The invention is provided to solve at least a part of the above problems and can be achieved as aspects or application examples described below.

[1]

According to an aspect of the invention, there is provided a vehicle brake system including an electric brake having at least one electric actuator for pushing a friction pad toward a rotor and a plurality of controllers, connected to each other, that control the electric actuator, the vehicle brake system including an output cut-off control unit that controls cut-off of an output of at least apart of the plurality of controllers, in which the plurality of controllers includes at least a first controller, a second controller, and a third controller, in which each of the first controller, the second controller, and the third controller includes a braking force calculation section that calculates a braking force of the electric brake, a self-determination section that determines whether the controller itself is normal, and an other-determination section that compares a braking force calculation result of the first controller, a braking force calculation result of the second controller, and a braking force calculation result of the third controller and determines whether the two controllers other than the controller itself among the first controller, second controller, and third controller are normal, and in which the output cut-off control unit determines whether the first controller is normal based on a determination result by the self-determination section of the first controller, a determination result by the self-determination section of the second controller, a determination result of the first controller by the other-determination section of the second controller, a determination result by the self-determination section of the third controller, and a determination result of the first controller by the other-determination section of the third controller and, when determining that the first controller is not normal, cuts off an output of the first controller.

In the vehicle brake system according to the aspect, the first controller, the second controller, and the third controller determine whether the first controller, the second controller, and the third controller are normal, respectively, and determines whether the other two controllers are normal by comparing the braking force calculation results of the controllers. Then, when the output cut-off control unit determines that the first controller is not normal based on the self-determination result by the first controller, the self-determination result and the determination result of the first controller by the second controller, and the self-determination result and the determination result of the first controller by the third controller, the output cut-off control unit can improve the reliability of the braking force calculation results and achieve the redundancy of the system by cutting off the output of the first controller.

[2]

In the vehicle brake system according to an aspect, the output cut-off control unit may cut off the output of the first controller when the self-determination section of the second controller determines that the second controller is normal, the self-determination section of the third controller determines that the third controller is normal, the other-determination section of the second controller determines that the first controller is not normal, and the other-determination section of the third controller determines that the first controller is not normal.

In the vehicle brake system according to the aspect, since the output of the first controller is cut off when the second controller and the third controller determine that the second controller and the third controller are normal, respectively, and the first controller is not normal, then the output of the first controller is surely cut off when the first controller is not normal, the reliability of the braking force calculation result can be improved, and the redundancy of the system can be achieved.

BRIEF DESCRIPTION OF DRAWINGS

FIG. 4 is an explanatory diagram illustrating an example of operation of the output cut-off control unit.

DESCRIPTION OF EMBODIMENTS

A preferable embodiment of the invention will be described in detail below with reference to the drawings. The drawings used for description are provided for convenience of description. It should be noted here that the invention designated in the appended claims is not improperly limited by the embodiment described below. Not all of the components described below are essential structural requirements of the invention.

A vehicle brake system according to the embodiment is a vehicle brake system including an electric brake having at least one electric actuator for pushing a friction pad toward a rotor and a plurality of controllers, connected to each other, that control the electric actuator, the vehicle brake system including an output cut-off control unit that controls cut-off of an output of at least apart of the plurality of controllers, in which the plurality of controllers includes at least a first controller, a second controller, and a third controller, in which each of the first controller, the second controller, and the third controller includes a braking force calculation section that calculates a braking force of the electric brake, a self-determination section that determines whether the controller itself is normal, and an other-determination section that compares a braking force calculation result of the first controller, a braking force calculation result of the second controller, and a braking force calculation result of the third controller and determines whether the two controllers other than the controller itself among the first controller, the second controller, and the third controller are normal, and in which the output cut-off control unit determines whether the first controller is normal based on a determination result by the self-determination section of the first controller, a determination result by the self-determination section of the second controller, a determination result of the first controller by the other-determination section of the second controller, a determination result by the self-determination section of the third controller, and a determination result of the first controller by the other-determination section of the third controller and, when determining that the first controller is not normal, cuts off an output of the first controller.

1. Vehicle Brake System

Figure 1:
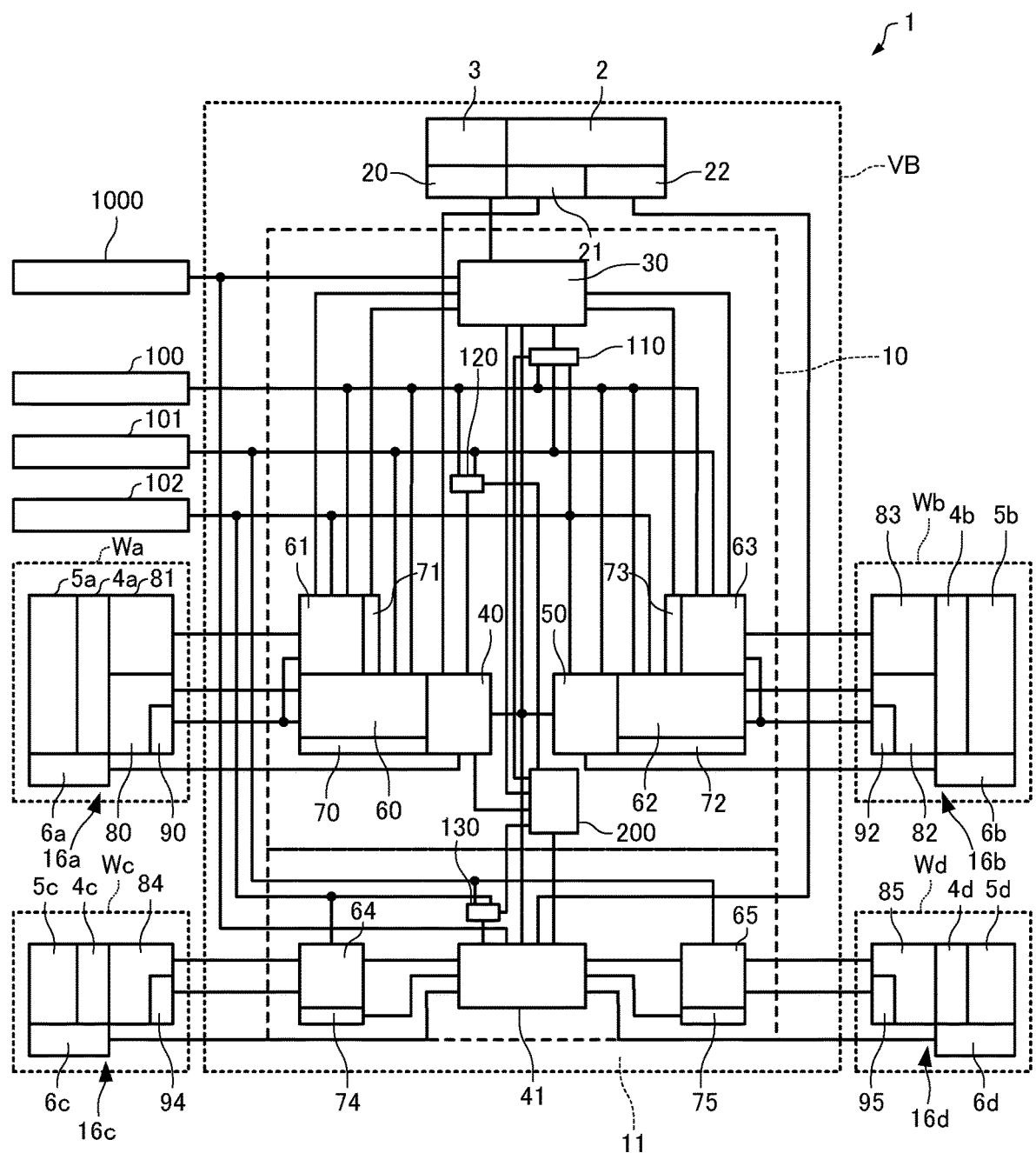
FIG. 1 is an entire structure diagram illustrating a vehicle brake system according to an embodiment.
Figure 2:
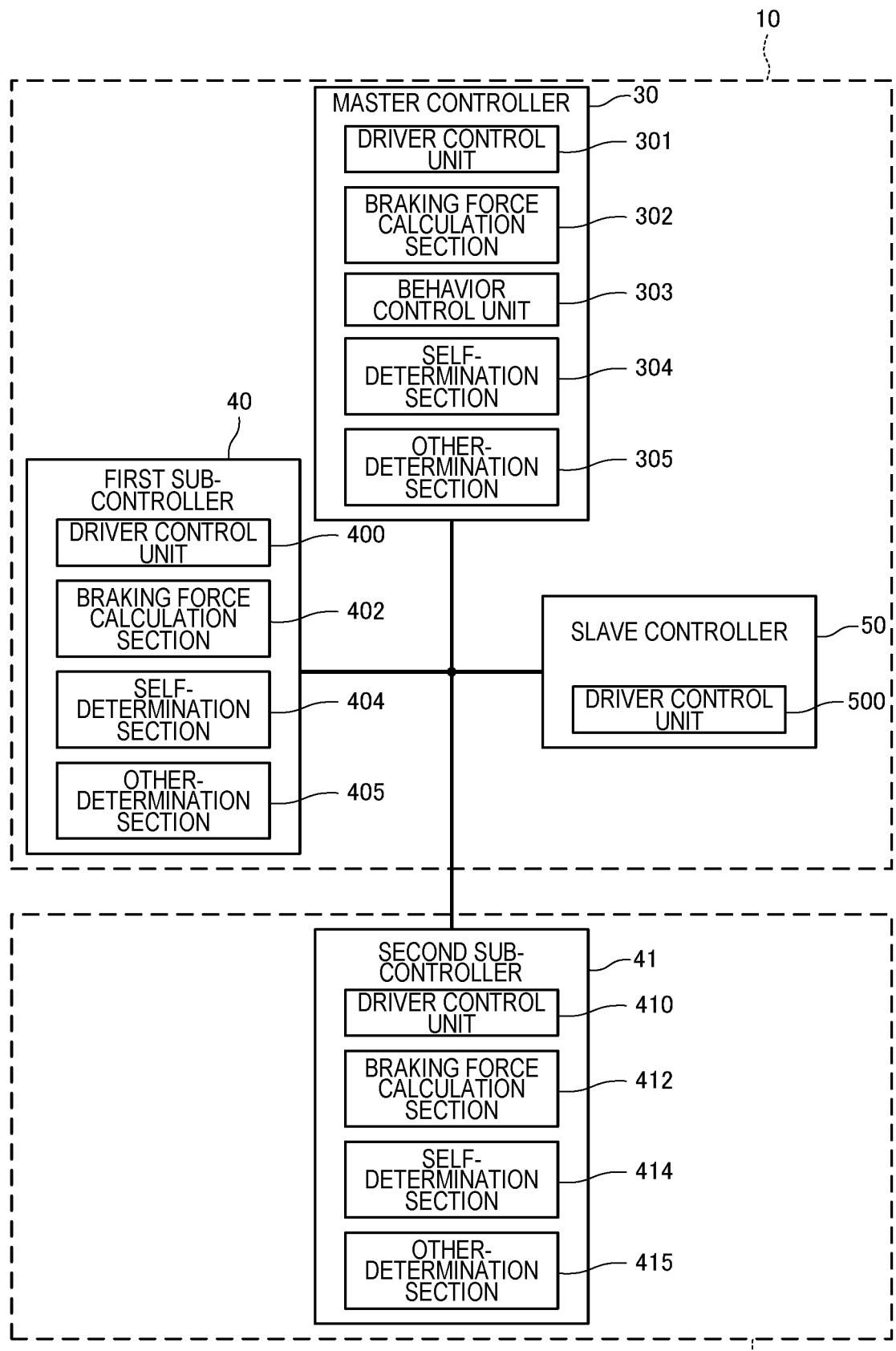
FIG. 2 is a block diagram illustrating a master controller, first and second sub-controllers, and a slave controller of the vehicle brake system according to the embodiment.

A vehicle brake system 1 according to the embodiment will be described with reference to FIGS. 1 to 4. FIG. 1 is an entire structure diagram illustrating the vehicle brake system 1 according to the embodiment and FIG. 2 is a block diagram illustrating a master controller 30, first and second sub-controllers 40 and 41, and a slave controller 50 of the vehicle brake system 1 according to the embodiment.

As illustrated in FIG. 1, the vehicle brake system 1 includes electric brakes 16a to 16d having at least one of motors 80 to 85 that are electric actuators for pushing friction pads (not illustrated) toward rotors (not illustrated), drivers 60 to 65 that drive the motors 80 to 85, control devices (10 and 11) having the plurality of controllers (the master controller 30, the first sub-controller 40, the second sub-controller 41, and the slave controller 50) connected to each other. The rotors (not illustrated) are provided for wheels Wa to Wd of a vehicle VB that is a four-wheel car and rotate integrally with the wheels Wa to Wd. It should be noted here that the vehicle VB is not limited to a four-wheel car. In addition, a plurality of motors may be provided for each electric brake and a plurality of electric brakes may be provided for each wheel.

1-1. Electric Brake

The electric brake 16a provided for the wheel Wa on the front wheel left side (FL) includes a brake caliper 5a, the motors 80 and 81 fixed to the brake caliper 5a via a reducer 4a, and a load sensor 6a that detects the load applied to a friction pad (not illustrated) by the motors 80 and 81. The motor 80 has the rotation angle sensor 90 that detects the relative position of the rotational shaft with respect to the stator thereof. Since the motor 81 is coaxial with the motor 80, the motor 81 does not need a rotation angle sensor. The detection signal from the load sensor 6a is input to the first sub-controller 40 (and the master controller 30 via the first sub-controller 40) and the detection signal from the rotation angle sensor 90 is input to the first sub-controller 40 and the master controller 30 via the drivers 60 and 61.

The electric brake 16b provided in the wheel Wb on the front wheel right side (FR) includes a brake caliper 5b, the motors 82 and 83 fixed to the brake caliper 5b via a reducer 4b, and a load sensor 6b that detects the load applied to a friction pad (not illustrated) by the motors 82 and 83. The motor 82 has the rotation angle sensor 92 that detects the relative position of the rotational shaft with respect to the stator thereof. Since the motor 83 is coaxial with the motor 82, the motor 83 does not need a rotation angle sensor. The detection signal from the load sensor 6b is input to the slave controller 50 (and the master controller 30 via the slave controller 50) and the detection signal from the rotation angle sensor 92 is input to the slave controller 50 and the master controller 30 via the drivers 62 and 63.

The electric brake 16c provided in the wheel Wc on the rear wheel left side (RL) includes a brake caliper 5c, the motor 84 fixed to the brake caliper 5c via a reducer 4c, and a load sensor 6c that detects the load applied to a friction pad (not illustrated) by the motor 84. The motor 84 has the rotation angle sensor 94 that detects the relative position of the rotational shaft with respect to the stator thereof. The detection signal from the load sensor 6c is input to the second sub-controller 41 and the detection signal from the rotation angle sensor 94 is input to the second sub-controller 41 via the driver 64.

The electric brake 16d provided for the wheel Wd on the rear wheel right side (RR) includes a brake caliper 5d, the motor 85 fixed to the brake caliper 5d via a reducer 4d, and a load sensor 6d that detects the load applied to a friction pad (not illustrated) by the motor 85. The motor 85 has the rotation angle sensor 95 that detects the relative position of the rotational shaft with respect to the stator thereof. The detection signal from the load sensor 6d is input to the second sub-controller 41 and the detection signal from the rotation angle sensor 95 is input to the second sub-controller 41 via the driver 65.

The brake calipers 5a to 5d are formed in a substantially C-shape and claws extending to the opposite side across the rotors (not illustrated) are provided integrally.

The reducers 4a to 4d are fixed to the brake calipers 5a to 5d and transfer the torques generated by the rotation of the motors 80 to 85 to linear-motion mechanisms (not illustrated) built into the brake calipers 5a to 5d.

The linear-motion mechanisms may adopt a known mechanism in electric brakes. The linear-motion mechanisms convert the rotation of the motors 80 to 85 to the linear-motion of the friction pads via the reducers 4a to 4d. The linear-motion mechanisms push the friction pads against the rotors to suppress the rotation of the wheels Wa to Wd.

The motors 80 to 85 may be known electric motors and are, for example, brushless' DC motors. When driven by the motors 80 to 85, the friction pads are moved via the reducers 4a to 4d and the linear-motion mechanisms. An example in which motors are used as the electric actuators will be described below, but the invention is not limited to this example and other known actuators may be used.

1-2. Input Device

The vehicle brake system 1 includes a brake pedal 2 as an input device and a stroke simulator 3 connected to the brake pedal 2. The brake pedal 2 includes a second stroke sensor 21 and a third stroke sensor 22 that detect the amount of operation of the brake pedal 2 by the driver. The stroke simulator 3 has the first stroke sensor 20 that detects the amount of operation of the brake pedal 2.

The stroke sensors 20 to 22 generate, independently of each other, electrical detection signals corresponding to a depression stroke and/or a depression force, which are forms of the amount of operation of the brake pedal 2. The first stroke sensor 20 transmits a detection signal to the master controller 30 described later, the second stroke sensor 21 transmits a detection signal to the first sub-controller 40 described later, and the third stroke sensor 22 transmits a detection signal to the second sub-controller 41 described later.

The vehicle VB has a plurality of control devices (referred to below as other control devices 1000) provided in a system other than the vehicle brake system 1, as an input device for the vehicle brake system 1. The other control devices 1000 are connected to the master controller 30 of the first control device 10 and the second sub-controller 41 of the second control device 11 through a CAN (Controller Area Network) so as to communicate information about brake operations with each other.

1-3. Control Device

The control device includes the first control device 10 and the second control device 11. The first control device 10 is disposed in a predetermined position in the vehicle VB independently of the second control device 11. The first control device 10 and the second control device 11 are electric control units (ECU). The first control device 10 and the second control device 11 are accommodated in cabinets made of synthetic resin. Accordingly, redundancy is achieved by the two control devices: the first control device 10 and the second control device 11. An example in which the two control devices are used is described, but only one control device may be disposed in consideration of disposition in the vehicle VB or three or more control devices may be disposed to further improve redundancy.

The first control device 10 and the second control device 11 are connected via a CAN so as to communicate with each other. In communication via a CAN, information is transmitted unidirectionally or bidirectionally. It should be noted here that communication between ECUs is not limited to a CAN.

The first control device 10 and the second control device 11 are electrically connected to three batteries 100, 101, and 102 that are independent of each other. The batteries 100, 101, and 102 supply electric power to electric components included in the first control device 10 and the second control device 11. The batteries 100, 101, and 102 of the vehicle brake system 1 are disposed in predetermined positions in the vehicle VB.

The first control device 10 has at least one master controller 30 and at least one first sub-controller 40 and the second control device 11 has at least one sub-controller (second sub-controller 41). Since the first control device 10 has the master controller 30 and the first sub-controller 40, the redundancy and reliability of the first control device 10 are improved.

In addition, the first control device 10 further includes the slave controller 50. Use of the slave controller 50 that is inexpensive achieves cost reduction. It should be noted here that a sub-controller may be used in place of the slave controller 50.

The master controller 30, the first and second sub-controllers 40 and 41, and the slave controller 50 are microcomputers.

The first control device 10 includes the master controller 30, the first sub-controller 40, and the slave controller 50. Since only one master controller, which is relatively expensive, is included even though redundancy is achieved by use of the plurality of controllers, cost reduction can be achieved. The master controller 30 needs high performance to include a behavior control unit 303 (behavior control unit 303 will be described later), so the master controller 30 becomes relatively more expensive than the first and second sub-controllers 40 and 41.

The first control device 10 includes a power supply voltage generation circuit 110 that generates the power supply voltage of the master controller 30 from the output voltages of the batteries 100 and 101 and a power supply voltage generation circuit 120 that generates the power supply voltage of the first sub-controller 40 from the output voltages of the batteries 100, 101, and 102. In addition, the second control device 11 includes a power supply voltage generation circuit 130 that generates the power supply voltage of the second sub-controller 41 from the output voltages of the batteries 101 and 102.

As illustrated in FIGS. 1 and 2, the master controller 30 includes a driver control unit 301 that controls the drivers 61 and 63, a braking force calculation unit 302 that calculates the braking forces of the electric brakes 16a to 16d, and the behavior control unit 303 that controls the behavior of the vehicle VB.

The first sub-controller 40 includes a driver control unit 400 that controls the driver 60 and a braking force calculation section 402 that calculates the braking forces of the electric brakes 16a to 16d. The second sub-controller 41 includes a driver control unit 400 that controls the drivers 64 and 65 and a braking force calculation section 412 that calculates the braking forces of the electric brakes 16a to 16d. The first and second sub-controllers 40 and 41 do not have behavior control units and adopt microcomputers more inexpensive than in the master controller 30, thereby contributing to cost reduction.

The slave controller 50 does not have a braking force calculation section and includes a driver control unit 500 that controls the driver 62 based on the braking force calculation result of at least one of the master controller 30 and the first and second sub-controllers 40 and 41. The slave controller 50 does not have a braking force calculation section and can thereby adopt a microcomputer relatively more inexpensive than in the first and second sub-controllers 40 and 41.

The drivers 60 to 65 control the driving by the motors 80 to 85. Specifically, the driver 60 controls the driving by the motor 80, the driver 61 controls the driving by the motor 81, the driver 62 controls the driving by the motor 82, the driver 63 controls the driving by motor 83, the driver 64 controls the driving by the motor 84, and the driver 65 controls the driving by the motor 85. The drivers 60 to 65 control the motors 80 to 85 using, for example, a sine wave driving method. Alternatively, the drivers 60 to 65 may perform control using, for example, rectangular wave currents instead of a sine wave driving method.

The drivers 60 to 65 have power supply circuits and inverters that supply the electric power corresponding to instructions by the driver control units 301, 400, 410, and 500 to the motors 80 to 85.

The braking force calculation sections 302, 402, and 412 calculate braking forces (requested values) based on the detection signals from the stroke sensors 20 to 22 corresponding to the amount of operation of the brake pedal 2. In addition, the braking force calculation sections 302, 402, and 412 can calculate braking forces (requested values) based on signals from the other control devices 1000.

The driver control units 301, 400, 410, and 500 control the drivers 60 to 65 based on the braking forces (requested values) calculated by the braking force calculation sections 302, 402, and 412, detection signals from the load sensor 6a to 6d, and detection signals from the rotation angle sensors 90, 92, 94, and 95. The drivers 60 to 65 supply sine wave currents for driving to the motors 80 to 85 according to the instructions from the driver control units 301, 400, 410, and 500. The currents supplied to the motors 80 to 85 are detected by current sensors 70 to 75.

The behavior control unit 303 outputs signals for controlling the behavior of the vehicle VB to the driver control units 301, 400, 410, and 500. The behavior control unit 303 controls behavior other than simple braking corresponding to a normal operation of the brake pedal 2 and achieves, for example, ABS (Antilock Brake System) that is control for preventing the wheels Wa to Wd from locking, TCS (Traction Control System) that is control for suppressing idle running of the wheels Wa to Wd, and behavior stabilizing control that is control for preventing a side slip of the vehicle VB.

The master controller 30 and the first and second sub-controllers 40 and 41 include self-determination sections 304, 404, and 414 that determine whether the master controller 30 and the first and second sub-controllers 40 and 41 are normal, respectively, based on calculation results by the braking force calculation sections 302, 402, and 412 thereof. For example, when the master controller 30 and the first and second sub-controllers 40 and 41 have a self-diagnosis function such as a lock step method, the self-determination sections 304, 404, and 414 may perform self-diagnosis and, based on diagnosis results, determine whether the master controller 30 and the first and second sub-controllers 40 and 41 are normal, respectively.

In addition, the master controller 30 and the first and second sub-controllers 40 and 41 include other-determination sections 305, 405, and 415 that determine whether the other controllers are normal by comparing the braking force calculation results of the controllers. Specifically, the other-determination section 305 of the master controller 30 compares the braking force calculation result (the calculation result by the braking force calculation section 302) of the master controller 30, the braking force calculation result (the calculation result by the braking force calculation section 402) of the first sub-controller 40, and the braking force calculation result (the calculation result by the braking force calculation section 412) of the second sub-controller 41 and determines whether the first sub-controller 40 and the second sub-controller 41 other than the master controller 30 are normal. In addition, the other-determination section 405 of the first sub-controller 40 compares the braking force calculation result (the calculation result by the braking force calculation section 402) of the first sub-controller 40, the braking force calculation result (the calculation result by the braking force calculation section 412) of the second sub-controller 41, and the braking force calculation result (the calculation result by the braking force calculation section 302) of the master controller 30 and determines whether the second sub-controller 41 and the master controller 30 other than the first sub-controller 40 are normal. In addition, the other-determination section 415 of the second sub-controller compares the braking force calculation result (the calculation result by the braking force calculation section 412) of the second sub-controller 41, the braking force calculation result (the calculation result by the braking force calculation section 302) of the master controller 30, and the braking force calculation result (the calculation result by the braking force calculation section 402) of the first sub-controller 40 and determines whether the master controller 30 and the first sub-controller 40 other than the second sub-controller 41 are normal.

The other-determination sections 305, 405, and 415 may determine by majority vote whether the other controllers are normal by comparing the calculation result by the braking force calculation section 302 of the master controller 30, the calculation result by the braking force calculation section 402 of the first sub-controller 40, and the calculation result by the braking force calculation section 412 of the second sub-controller 41. For example, when only the calculation result by the braking force calculation section 412 is different from the other calculation results (the calculation results by the braking force calculation sections 302 and 402) (for example, when the difference between the calculation result by the braking force calculation section 412 and the other calculation results exceeds a predetermined threshold or when the calculation result cannot be obtained from the braking force calculation section 412), the other-determination section 305 determines that the second sub-controller 41 is not normal and determines that the first sub-controller 40 is normal. Alternatively, when only the calculation result by the braking force calculation section 302 is different from the other calculation results (the calculation results by the braking force calculation sections 402 and 412) (for example, when the difference between the calculation result by the braking force calculation section 302 and the other calculation results exceeds a predetermined threshold or when the calculation result cannot be obtained from the braking force calculation section 302), the other-determination section 405 determines that the master controller 30 is not normal and determines that the second sub-controller 41 is normal. Alternatively, when only the calculation result by the braking force calculation section 402 is different from the other calculation results (the calculation results by the braking force calculation sections 302 and 412) (for example, when the difference between the calculation result by the braking force calculation section 402 and the other calculation results exceeds a predetermined threshold or when the calculation result cannot be obtained from the braking force calculation section 402), the other-determination section 415 determines that the first sub-controller 40 is not normal and determines that the master controller 30 is normal.

The driver control units adopt, as braking forces, the calculation results by the controllers determined to be normal by the self-determination sections and the other-determination sections and control the drivers based on the calculation results. For example, when it is determined that the master controller 30 is not normal, the driver control unit 400 controls the driver 60 based on the calculation result by the braking force calculation section 402, the driver control unit 410 controls the drivers 64 and 65 based on the calculation result by the braking force calculation section 412, and the driver control unit 500 controls the driver 62 based on the calculation result by the braking force calculation section 402 or the braking force calculation section 412. Alternatively, when it is determined that the first sub-controller 40 is not normal, driver control unit 301 controls the drivers 61 and 63 based on the calculation result by the braking force calculation section 302, the driver control unit 410 controls the drivers 64 and 65 based on the calculation result by the braking force calculation section 412, and the driver control unit 500 controls the driver 62 based on the calculation result by the braking force calculation section 302 or the braking force calculation section 412. Alternatively, when it is determined that the second sub-controller 41 is not normal, the driver control unit 301 controls the drivers 61 and 63 based on the calculation result by the braking force calculation section 302, the driver control unit 400 controls the driver 60 based on the calculation result by the braking force calculation section 402, and the driver control unit 500 controls the driver 62 based on the calculation result by the braking force calculation section 302 or the braking force calculation section 402.

The first control device 10 has an output cut-off control unit 200 that controls the cut-off of outputs of the master controller 30, the first sub-controller 40, and the second sub-controller 41 that are at least parts of the plurality of controllers (the master controller 30, the first sub-controller 40, the second sub-controller 41, and the slave controller 50). The outputs of the controllers include, for example, control signals (instructions) for drivers by the driver control units, signals of determination results by the self-determination sections or the other-determination sections, and the like. It should be noted here that the second control device 11 may have the output cut-off control unit 200, or the first control device 10 may has a part of the output cut-off control unit 200 and the second control device 11 may have another part of the output cut-off control unit 200. Alternatively, a part or all of the output cut-off control unit 200 may be provided outside the first control device 10 and the second control device 11.

The output cut-off control unit 200 determines whether the master controller 30 is normal based on the determination result by the self-determination section 304 of the master controller 30, the determination result by the self-determination section 404 of the first sub-controller 40, the determination result of the master controller 30 by the other-determination section 405 of the first sub-controller 40, the determination result by the self-determination section 414 of the second sub-controller 41, and the determination result of the master controller 30 by the other-determination section 415 of the second sub-controller 41 and, when determining that the master controller 30 is not normal, cuts off the output of the master controller 30. Specifically, the output cut-off control unit 200 stops the operation of the master controller 30 by performing control so that the power voltage is not output from the power supply voltage generation circuit 110 to the master controller 30, thereby cutting off the output of the master controller 30 (for example, the voltages of all output terminals become 0 V).

In addition, the output cut-off control unit 200 determines whether the first sub-controller 40 is normal based on the determination result by the self-determination section 404 of the first sub-controller 40, the determination result by the self-determination section 414 of the second sub-controller 41, the determination result of the first sub-controller 40 by the other-determination section 415 of the second sub-controller 41, the determination result by the self-determination section 304 of the master controller 30, and the determination result of the first sub-controller 40 by the other-determination section 305 of the master controller 30 and, when determining that the first sub-controller 40 is not normal, cuts off the output of the first sub-controller 40. Specifically, the output cut-off control unit 200 stops the operation of the first sub-controller 40 by performing control so that the power voltage from the power supply voltage generation circuit 120 to the first sub-controller 40 is not output, thereby cutting off the output of the first sub-controller 40 (for example, the voltages of all output terminals become 0 V).

In addition, the output cut-off control unit 200 determines whether the second sub-controller 41 is normal based on the determination result by the self-determination section 414 of the second sub-controller 41, the determination result by the self-determination section 304 of the master controller 30, the determination result of the second sub-controller 41 by the other-determination section 305 of the master controller 30, the determination result by the self-determination section 404 of the first sub-controller 40, and the determination result of the second sub-controller 41 by the other-determination section 405 of the first sub-controller 40 and, when determining that the second sub-controller 41 is not normal, cuts off the output of the second sub-controller 41. Specifically, the output cut-off control unit 200 stops the operation of the second sub-controller 41 by performing control so that the power voltage from the power supply voltage generation circuit 130 to the second sub-controller 41 is not output, thereby cutting off the output of the second sub-controller 41 (for example, the voltages of all output terminals become 0 V).

Since the output of the controller determined to be not normal is cut off by the output cut-off control unit 200 as described above, it is possible to prevent the controller determined to be not normal from controlling the drivers.

When the number of controllers (master controller and sub-controllers) normally operated is two or less because the output of the controller determined to be not normal is cut off by the output cut-off control unit 200, since the other-determination sections 305, 405, and 415 cannot perform majority vote for obtaining the braking force calculation result, these determination sections do not perform determination as to whether the other controllers are normal from then on.

Figure 3:
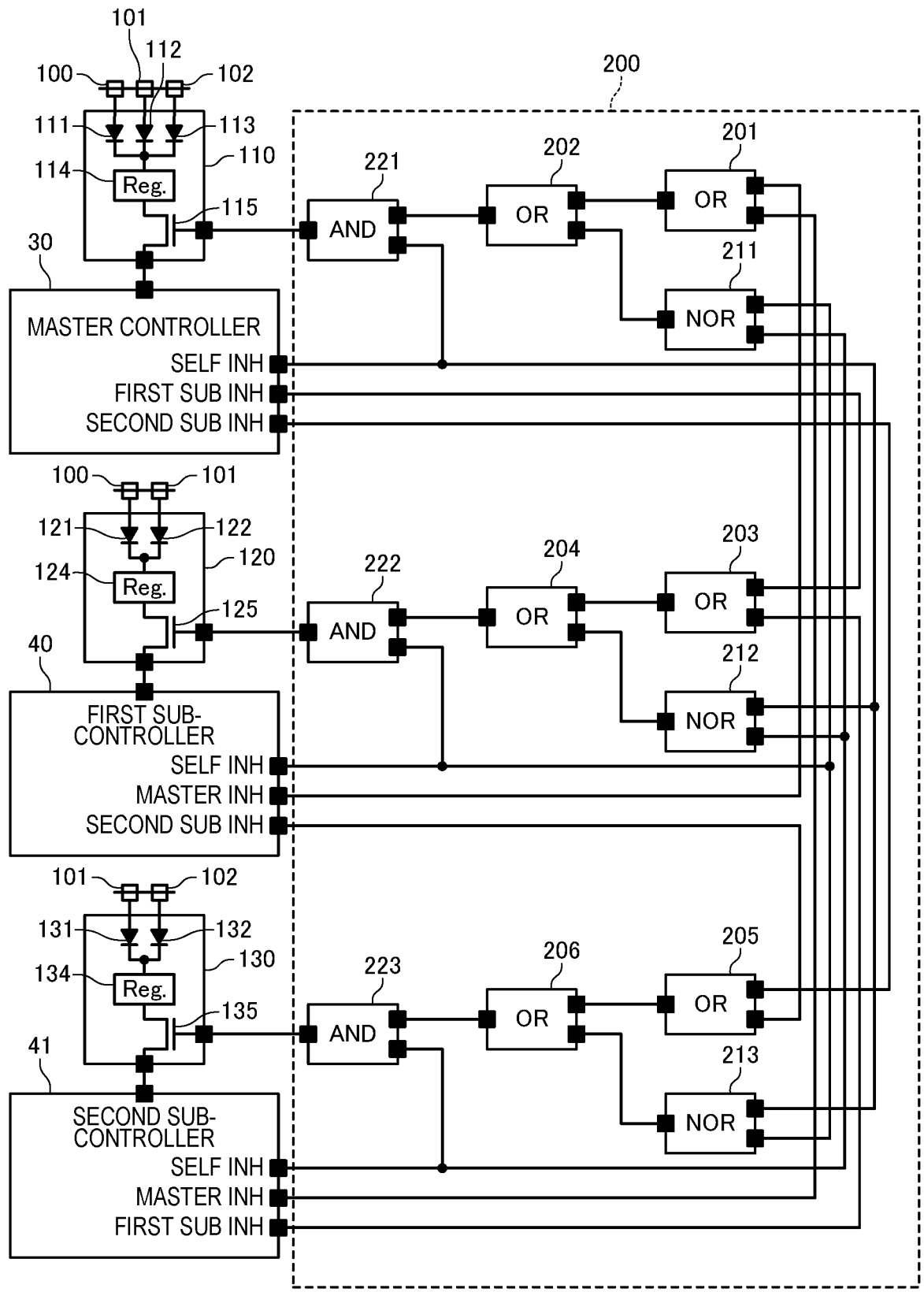
FIG. 3 illustrates a structure example of an output cut-off control unit.

FIG. 3 illustrates a structure example of the output cut-off control unit 200. In the example illustrated in FIG. 3, the master controller 30 outputs a self INH signal indicating the determination result by the self-determination section 304, a first sub INH signal indicating the determination result of the first sub-controller 40 by the other-determination section 305, and a second sub INH signal indicating the determination result of the second sub-controller 41 by the other-determination section 305. Similarly, the first sub-controller 40 outputs the self INH signal indicating the determination result by the self-determination section 404, a master INH signal indicating the determination result of the master controller 30 by the other-determination section 405, and the second sub INH signal indicating the determination result of the second sub-controller 41 by the other-determination section 405. Similarly, the second sub-controller 41 outputs the self INH signal indicating the determination result by the self-determination section 414, the master INH signal indicating the determination result of the master controller 30 by the other-determination section 415, and the first sub INH signal indicating the determination result of the first sub-controller 40 by the other-determination section 415. Any of the self INH signal, the master INH signal, the first sub INH signal, and the second sub INH signal represents the determination result that the target controller is normal when the level is high (logical value of 1) and represents the determination result that the target controller is not normal (fails) when the level is low (logical value of 0).

In the example in FIG. 3, the output cut-off control unit 200 includes two-input OR elements 201 to 206, two-input NOR elements 211 to 213, and two-input AND elements 221 to 223.

The OR element 201 outputs a signal indicating the logical OR of the master INH signal output by the first sub-controller 40 and the master INH signal output by the second sub-controller 41. The NOR element 211 outputs a signal indicating the logical NOR of the self INH signal output by the first sub-controller 40 and the self INH signal output by the second sub-controller 41. The OR element 202 outputs a signal indicating the logical OR of the output signal of the OR element 201 and output signal of the NOR element 211. The AND element 221 outputs a signal indicating the logical AND of the output signal of the OR element 202 and the self INH signal output by the master controller 30. The output signal of this AND element 221 is a signal (high level: normal, low level: not normal) indicating the determination result by the output cut-off control unit 200 as to whether the master controller 30 is normal and supplied to the power supply voltage generation circuit 110.

The OR element 203 outputs a signal indicating the logical OR of the first sub INH signal output by the master controller 30 and the first sub INH signal output by the second sub-controller 41. The NOR element 212 outputs a signal indicating the logical NOR of the self INH signal output by the master controller 30 and the self INH signal output by the second sub-controller 41. The OR element 204 outputs a signal indicating the logical OR of the output signal of the OR element 203 and the output signal of the NOR element 212. The AND element 222 outputs a signal indicating the logical AND of the output signal of the OR element 204 and the self INH signal output by the first sub-controller 40. The output signal of this AND element 222 is a signal (high level: normal, low level: not normal) indicating a determination result by the output cut-off control unit 200 as to whether the first sub-controller 40 is normal and supplied to the power supply voltage generation circuit 120.

The OR element 205 outputs a signal indicating the logical OR of the second sub INH signal output by the master controller 30 and the second sub INH signal output by the first sub-controller 40. The NOR element 213 outputs a signal indicating the logical NOR of the self INH signal output by the master controller 30 and the self INH signal output by the first sub-controller 40. The OR element 206 outputs a signal indicating the logical OR of the output signal of the OR element 205 and the output signal of the NOR element 213. The AND element 223 outputs a signal indicating the logical AND of the output signal of the OR element 206 and the self INH signal output by the second sub-controller 41. The output signal of this AND element 223 is a signal (high level: normal, low level: not normal) indicating a determination result by the output cut-off control unit 200 as to whether the second sub-controller 41 is normal and supplied to the power supply voltage generation circuit 130.

The power supply voltage generation circuit 110 generates the power voltage of the master controller 30 from the output voltages of the batteries 100, 101, and 102 supplied via diodes 111, 112, and 113 by a regulator 114. In addition, the power supply voltage generation circuit 110 supplies the power voltage generated by the regulator 114 to the master controller 30 through an FET (Field Effect Transistor) 115 when the output signal of the AND element 221 is at a high level or the power supply voltage generation circuit 110 cuts off the supply of the power voltage generated by the regulator 114 to the master controller 30 through the FET 115 when the output signal of the AND element 221 is at a low level.

The power supply voltage generation circuit 120 generates the power voltage of the first sub-controller 40 from the output voltages of the batteries 100 and 101 supplied via diodes 121 and 122 by a regulator 124. In addition, the power supply voltage generation circuit 120 supplies the power voltage generated by the regulator 124 to the first sub-controller 40 through an FET 125 when the output signal of the AND element 222 is at the high level or the power supply voltage generation circuit 120 cuts off the supply of the power voltage generated by the regulator 124 to the first sub-controller 40 through the FET 125 when the output signal of the AND element 222 is at the low level.

The power supply voltage generation circuit 130 generates the power voltage of the second sub-controller 41 from the output voltages of the batteries 101 and 102 supplied via diodes 131 and 132 by a regulator 134. In addition, the power supply voltage generation circuit 130 supplies the power voltage generated by the regulator 134 to the second sub-controller 41 through an FET 135 when the output signal of the AND element 223 is at the high level or the power supply voltage generation circuit 130 cuts off the supply of the power voltage generated by the regulator 134 to the second sub-controller 41 through the FET 135 when the output signal of the AND element 223 is at the low level.

Accordingly, the FETs 115, 125, and 135 of the power supply voltage generation circuits 110, 120, and 130 function as fail-safe relays that cut off the supply of electric power to the controllers (master controller 30, first sub-controller 40, and second sub-controller 41) determined to be not normal by the output cut-off control unit 200.

FIG. 4 is an explanatory diagram illustrating an example of operation of the output cut-off control unit 200. FIG. 4 illustrates ten cases in which the logical values of signals and ON or OFF of the supply of electric power to the master controller 30 are shown. It should be noted here that unhatched logical values are correct and hatched logical values are incorrect in FIG. 4. For example, the hatch lines of the self INH output of the master controller 30 in case (2) indicate that the logical value of the self INH signal is incorrect because the self INH signal is at the high level even though the master controller 30 fails actually.

In case (1), the master controller 30, the first sub-controller 40, and the second sub-controller 41 are normal, the output signal of the AND element 221 is at the high level (logical value of 1), and electric power is supplied to the master controller 30 that is normal.

Case (2) and case (3) are the cases in which the master controller 30 is not normal (fails) and the first sub-controller 40 and the second sub-controller 41 are normal. However, the self INH signal of the master controller 30 is at the high level (logical value of 1) (the logical value is incorrect) in case (2) while the self INH signal of the master controller 30 is at the low level (logical value of 0) (the logical value is correct) in case (3). In case (2) and case (3), the output signal of the AND element 221 is at the low level (logical value of 0) and the supply of electric power to the master controller 30 that is not normal is cut off. As in case (2) or case (3), the output cut-off control unit 200 cuts off the output of the master controller 30 when the self-determination section 404 of the first sub-controller 40 determines that the first sub-controller 40 is normal (the self INH signal of the first sub-controller 40 is at the high level), the self-determination section 414 of the second sub-controller 41 determines that the second sub-controller 41 is normal (the self INH signal of the second sub-controller 41 is at the high level), the other-determination section 405 of the first sub-controller 40 determines that the master controller 30 is not normal (the master INH signal of the first sub-controller 40 is at the low level), and the other-determination section 415 of the second sub-controller 41 determines that the master controller 30 is not normal (the master INH signal of the second sub-controller 41 is at the low level).

Case (4) and case (5) are the cases in which the first sub-controller 40 is not normal (fails) and the master controller 30 and the second sub-controller 41 are normal. However, the master INH signal of the first sub-controller 40 is at the low level (logical value of 0) (the logical value is incorrect) and the self INH signal of the first sub-controller 40 is at the high level (logical value of 1) (the logical value is incorrect) in case (4) while the master INH signal of the first sub-controller 40 is at the high level (logical value of 1) (the logical value is correct) and the self INH signal of the first sub-controller 40 is at the low level (logical value of 0) (the logical value is correct) in case (5). In case (4) and case (5), the output signal of the AND element 221 is at the high level (logical value of 1) and electric power is supplied to the master controller 30 that is normal.

Case (6) and case (7) are the cases in which the second sub-controller 41 is not normal (fails) and the master controller 30 and the first sub-controller 40 are normal. However, the master INH signal of the second sub-controller 41 is at the low level (logical value of 0) (the logical value is incorrect) and the self INH signal of the second sub-controller 41 is at the high level (logical value of 1) (the logical value is incorrect) in case (6) while the master INH signal of the second sub-controller 41 is at the high level (logical value of 1) (the logical value is correct) and the self INH signal of the second sub-controller 41 is at the low level (logical value of 0) (the logical value is correct) in case (7). In case (6) and case (7), the output signal of the AND element 221 is at the high level (logical value of 1) and electric power is supplied to the master controller 30 that is normal.

As incase (4), case (5), case (6), or case (7), the output cut-off control unit 200 does not cut off the output of the master controller 30 when the self-determination section 304 of the master controller 30 determines that the master controller 30 is normal (the self INH signal of the master controller 30 is at the high level) and at least one of the other-determination section 405 of the first sub-controller 40 and the other-determination section 415 of the second sub-controller 41 determines that the master controller 30 is normal (at least one of the master INH signal of the first sub-controller 40 and the master INH signal of the second sub-controller 41 is at the high level).

Case (8) is the case in which the output of the first sub-controller 40 is cut off and the master controller 30 and the second sub-controller 41 are normal. In case (8), the master INH signal and the self INH signal of the first sub-controller 40 are at the low level (logical value of 0) and the self INH signal of the master controller 30 and the master INH signal and the self INH signal of the second sub-controller 41 are at the high level (logical value of 1). Therefore, the output signal of the AND element 221 becomes the high level (logical value of 1) and electric power is supplied to the master controller 30 that is normal. When the output of the first sub-controller 40 is cut off as in case (8), the output cut-off control unit 200 does not cut off the output of the master controller 30 when the self-determination section 304 of the master controller 30 determines that the master controller 30 is normal (the self INH signal of the master controller 30 is at the high level) and the other-determination section 415 of the second sub-controller 41 determines that the master controller 30 is normal (the master INH signal of the second sub-controller 41 is at the high level).

Case (9) is the case in which the output of the second sub-controller 41 is cut off and the master controller 30 and the first sub-controller 40 are normal. Incase (9), the master INH signal and the self INH signal of the second sub-controller 41 are at the low level (logical value of 0) and the self INH signal of the master controller 30 and the master INH signal and the self INH signal of the first sub-controller 40 are at the high level (logical value of 1). Therefore, the output signal of the AND element 221 becomes the high level (logical value of 1) and electric power is supplied to the master controller 30 that is normal. When the output of the second sub-controller 41 is cut off as incase (9), the output cut-off control unit 200 does not cut off the output of the master controller 30 when the self-determination section 304 of the master controller 30 determines that the master controller 30 is normal (the self INH signal of the master controller 30 is at the high level) and the other-determination section 405 of the first sub-controller 40 determines that the master controller 30 is normal (the master INH signal of the first sub-controller 40 is at the high level).

Case (10) is the case in which the outputs of the first sub-controller 40 and the second sub-controller 41 are cut off and the master controller 30 is normal. In case (10), the master INH signal and the self INH signal of the first sub-controller 40 and the master INH signal and the self INH signal of the second sub-controller 41 are at the low level (logical value of 0) and the self INH signal of the master controller 30 is at the high level (logical value of 1). Therefore, the output signal of the AND element 221 becomes the high level (logical value of 1) and electric power is supplied to the master controller 30 that is normal. When the outputs of the first sub-controller 40 and the second sub-controller 41 are cut off as in case (10), the output cut-off control unit 200 does not cut off the output of the master controller 30 when the self-determination section 304 of the master controller 30 determines that the master controller 30 is normal (the self INH signal of the master controller 30 is at the high level).

Although not described in detail, the output cut-off control unit 200 controls the cut-off of outputs of the first sub-controller 40 and the second sub-controller 41 as in the master controller 30.

It should be noted here that the master controller 30, the first sub-controller 40, and the second sub-controller 41 in the embodiment correspond to the "first controller", the "second controller", and the "third controller" in the invention. Alternatively, the master controller 30, the first sub-controller 40, and the second sub-controller 41 correspond to the "third controller", "first controller", and the "second controller" in the invention. Alternatively, the master controller 30, the first sub-controller 40, and the second sub-controller 41 correspond to the "second controller", the "third controller", and the "first controller" in the invention.

The vehicle brake system 1 according to the embodiment has at least three controllers (master controller and sub-controllers) with braking force calculation sections and at least one of the controllers determines whether the controllers are normal by comparing the braking force calculation results of the controllers and improves the reliability of the braking force calculation results by cutting of the outputs of controllers determined to be not normal, thereby achieving the redundancy of the vehicle brake system 1.

In the vehicle brake system 1 according to the embodiment, the master controller 30, the first sub-controller 40, and the second sub-controller 41 determine whether the first controller, the second controller, and the third controller are normal, respectively, and determines whether the other two controllers are normal by comparing the braking force calculation results of the controllers. Then, when determining that the first controller is not normal based on the self-determination result by the first controller (one of the master controller 30, the first sub-controller 40, and the second sub-controller 41), the self-determination result and the determination result of the first controller by the second controller (another one of the master controller 30, the first sub-controller 40, and the second sub-controller 41), the self-determination result and the determination result of the first controller by the third controller (another one of the master controller 30, the first sub-controller 40, and the second sub-controller 41), then the output cut-off control unit can improve the reliability of the braking force calculation results by cutting of the output of the first controller, thereby achieving the redundancy of the vehicle brake system 1.

In particular, in the vehicle brake system 1 according to the embodiment, since the output of the first controller is cut off when the second controller and the third controller determines that the second controller and the third controller are normal, respectively, and the first controller is not normal, then the output of the first controller is surely cut off when the first controller is not normal, the reliability of the braking force calculation results can be improved, and the redundancy of the vehicle brake system 1 can be achieved.

In addition, in the vehicle brake system 1 according to the embodiment, at least three controllers are installed in different control devices (the first control device 10 and the second control device 11), so that the redundancy of the vehicle brake system 1 can be improved and the controllability can be improved by independently controlling the front and rear wheels through the first control device 10 and the second control device 11.

The invention is not limited to the above embodiment and various modifications can be further made. For example, the invention includes substantially the same structure (for example, the structure having the same function, method, and result or the structure having the same purpose and effect) as the structure described in the embodiment. In addition, the invention includes a structure obtained by replacing an inessential part of the structure described in the embodiment. In addition, the invention includes a structure having the same working effect as the structure described in the embodiment or a structure capable of achieving the same object. In addition, the invention includes a structure obtained by adding a known technique to the structure described in the embodiment.

REFERENCE SIGNS LIST

1: vehicle brake system
2: brake pedal
3: stroke simulator
4*a* to 4*d*: reducer
5*a* to 5*d*: brake caliper
6*a* to 6*d*: load sensor
10: first control device
11: second control device
16*a* to 16*d*: electric brake
20: first stroke sensor
21: second stroke sensor
22: third stroke sensor
30: master controller
301: driver control unit
302: braking force calculation section
303: behavior control unit
304: self-determination section
305: other-determination section
40: first sub-controller
400: driver control unit
402: braking force calculation section
404: self-determination section
405: other-determination section
41: second sub-controller
410: driver control unit
412: braking force calculation section
414: self-determination section
415: other-determination section
50: slave controller
500: driver control unit
60 to 65: driver
70 to 75: current sensor
80 to 85: motor
90, 92, 94, 95: rotation angle sensor
100 to 102: battery
110: power supply voltage generation circuit
111 to 113: diode
114: regulator
115: FET
120: power supply voltage generation circuit
121, 122: diode
124: regulator
125: FET
130: power supply voltage generation circuit
131, 132: diode
134: regulator
135: FET
200: output cut-off control unit
201 to 206: OR element
211 to 213: NOR element
221 to 223: AND element
1000: other control devices
VB: vehicle
Wa to Wd: wheel

The invention claimed is:

1. A vehicle brake system including an electric brake having at least one electric actuator for pushing a friction pad toward a rotor and a plurality of controllers, connected to each other, that control the electric actuator, the vehicle brake system comprising:
an output cut-off control unit that controls cut-off of an output of at least a part of the plurality of controllers,
wherein the plurality of controllers includes at least a first controller, a second controller, and a third controller,
wherein each of the first controller, the second controller, and the third controller includes
a braking force calculation section that calculates a braking force of the electric brake,
a self-determination section that determines whether the controller itself is normal, and
an other-determination section that compares a braking force calculation result of the first controller, a braking force calculation result of the second controller, and a braking force calculation result of the third controller and determines whether the two controllers other than the controller itself among the first controller, the second controller, and the third controller are normal, and
wherein the output cut-off control unit determines whether the first controller is normal based on a determination result by the self-determination section of the first controller, a determination result by the self-determination section of the second controller, a determination result of the first controller by the other-determination section of the second controller, a determination result by the self-determination section of the third controller, and a determination result of the first controller by the other-determination section of the third controller and, when determining that the first controller is not normal, cuts off an output of the first controller.

2. The vehicle brake system according to claim 1, wherein the output cut-off control unit cuts off the output of the first controller when the self-determination section of the second controller determines that the second controller is normal, the self-determination section of the third controller determines that the third controller is normal, the other-determination section of the second controller determines that the first controller is not normal, and the other-determination section of the third controller determines that the first controller is not normal.

* * * * *